M. R. RODRIGUES.
COT HOLDER.
APPLICATION FILED SEPT. 9, 1908.
958,895.
Patented May 24, 1910.
2 SHEETS—SHEET 1.
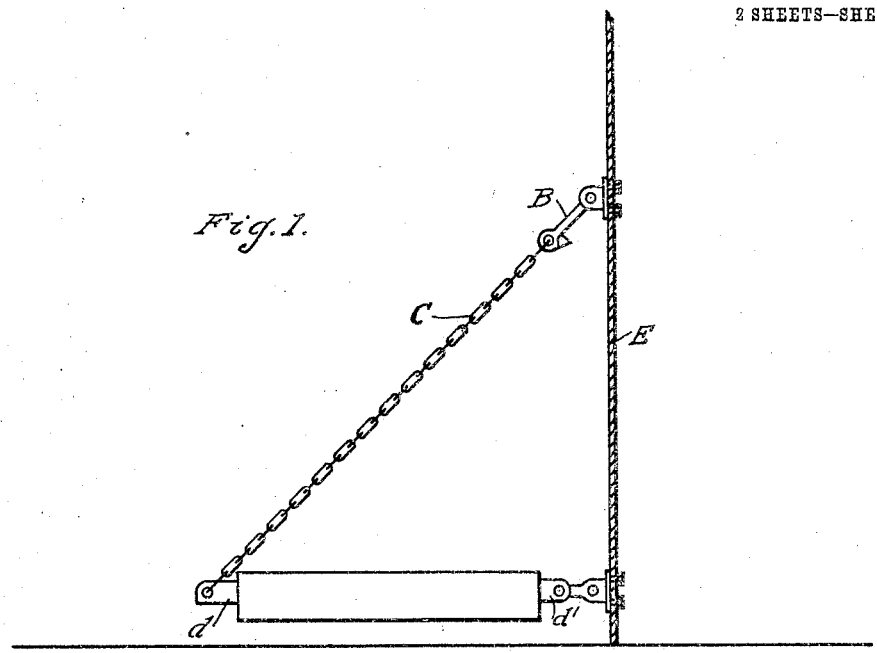
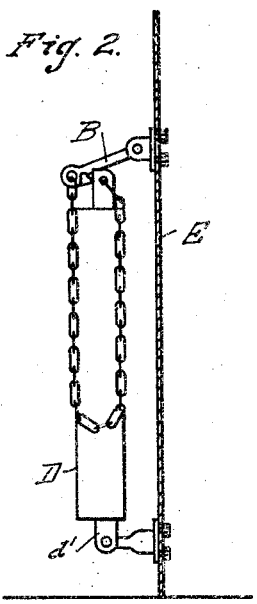
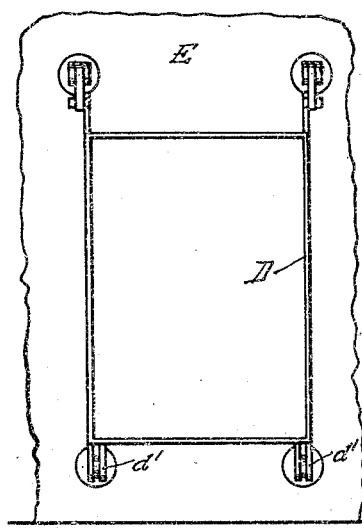
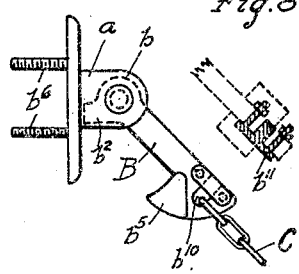
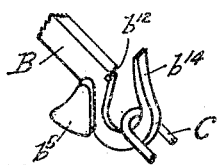

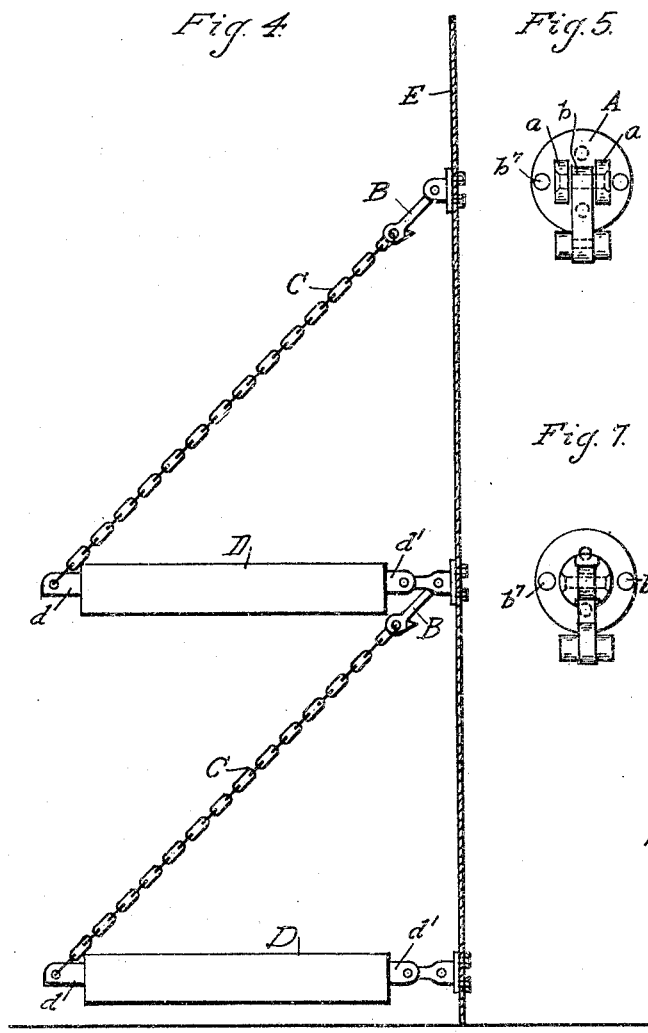

UNITED STATES PATENT OFFICE.

MANUEL R. RODRIGUES, OF NEW YORK, N. Y.

COT-HOLDER.

958,895.  Specification of Letters Patent.  Patented May 24, 1910.

Application filed September 9, 1908. Serial No. 452,328.

*To all whom it may concern:*

Be it known that I, MANUEL R. RODRIGUES, a citizen of the United States of America, and a resident of the borough of Brooklyn, of the city of New York, county of Kings, and State of New York, have invented a certain new and useful Cot-Holder, of which the following is a specification, the same being a full, clear, and exact description of the invention, such as will enable others skilled in the art to which it appertains to make and use the same.

This invention relates to folding beds, and in particular to means whereby swinging cots may be held either in a lowered or open position, or else may be automatically caught and held approximately parallel to the wall or other support when the same are raised, and it has for its object the provision of a device or apparatus of the kind set forth, simple in construction, inexpensive to manufacture, and which operates easily, and which is also efficient and durable in practical use.

To attain the desired end, the invention consists in novel devices and combinations of devices as hereinafter described.

In order to enable the invention to be fully understood, I shall proceed to explain the same by reference to the drawings, illustrative of one embodiment of the invention, which accompany and form a part of this specification, in which—

Figures 1 and 4 represent side elevations, partly in section, of a cot bed and supporting means in which my invention is embodied, Fig. 2 is a similar view of the bed shown in Fig. 1, shown in a closed relation, Fig. 3 is an elevation of the bed frame, Figs. 5 and 5$^a$ are respectively a plan and an elevation of a cot holder, Fig. 6 is another form of cot holder constructed according to my invention, Figs. 7, 7$^a$ and 7$^b$ are views in detail of my combined cot support and holder, and Figs. 8, 8$^a$ and 9 are views in detail of other forms of latches in which my invention is embodied.

Like letters of reference indicate like parts in all views.

Referring particularly to the drawings by reference symbols or characters, A denotes my cot holder ordinarily provided with a latch B, which cot holder may consist of a plate formed with two lugs $a$, intermediate of which is ordinarily located the shank $b$ of a movable member, as the latch B, or it may be otherwise constructed, as at A', where a single lug $a'$ is partly inclosed by the fork $b'$ of the latch B'. The preferably gravity latch, which is usually pivoted to the holder proper, is ordinarily made with a stop $b^2$ located near one end thereof, and has at the other extremity means, as an eye $b^3$ for purposes of attachment thereto of the chain C, although, manifestly, a wire rope may be substituted for the latter, the other end of the chain being secured to the extension $d$ of the preferably metallic bed frame D, and located at one end thereof, the other end being ordinarily provided with duplex perforated ears $d'$ forming one member of a hinge. The latch is ordinarily formed with means to hold up the cot in an approximately vertical position, as a hook $b^4$ positioned at the outer part thereof, the said hook being made with a lateral projection $b^5$ at one or both sides thereof.

The cot holder is constructed in any suitable manner so as to be securely attached to a support, as the wall E, ordinarily made of steel, by means of any preferred devices, as by pins $b^6$ which may serve as steady pins, or which may be threaded so as to hold nuts to work thereon, and the said cot holder may also be made with orifices $b^7$ for purposes of bolting or riveting the same to a support, which latter devices may be used collectively with the said pins, or alternatively without the same.

The cot holder F is ordinarily made substantially like the one described, except that it has a perforated extension $f$ to engage the ears $d'$ of the cot bed D and to serve as a member of a hinge. It may also be adapted to support the pivoted latch B, as shown.

In cases where two cot beds are used, the cot holders A and F are ordinarily placed in alinement and the chain is attached to the center of the latch B and that of the extension $d$ at the upper end and at one side of the cot bed, and the center of the said latch B may therefore be out of alinement with the plane of the said extension. In order to allow of the engagement of the latch B and the extension $d$, which may not be in alinement, suitable means may be provided for the engagement thereof, as for example, the said latch is usually provided, as stated, with a lateral projection $b^5$ in order to pass over the said extension.

Suitable means may be provided for the attachment of the chain to the latch, as for instance, the latch may be formed with a slot $b^{10}$, Fig. 8, which may be closed by a plate $b^{11}$ secured to the latch after the chain is inserted in the cot holder, or the extension $b^{14}$ of the latch may be forced or hammered down to a seat $b^{12}$ formed at the opposite side of the slot.

In operation the single or duplex cot beds are set up, as described and shown, and when in a lowered relation they may be raised and automatically caught and held in an upper approximately vertical position by a simple movement of the hand, and when it is desired to lower the cot beds again, it is readily accomplished by merely raising the latch, after which the cot bed may be caused to assume the lowered approximately horizontal position again.

I wish it to be understood that I do not desire to be limited to the exact details of construction shown and described, for obvious modifications will occur to a person skilled in the art.

What I claim as my invention is:—

1. In a device of the kind described, a cot, means attached to a support to hold one end of the same in a movable relation, means also attached, in a movable relation, to the support to engage the other end of the cot, and connecting means located intermediate, and attached to both, the cot and the last named holding means.

2. In a device of the class described, a cot, means attached to a support to hold one end of the same in a movable relation, means also attached to the support having a movable member to hold up the other end of the cot, said movable member having a projection near one end to form a stop to limit the inward movement thereof, and a projection at the other end to serve as a hook, and connecting means located intermediate the movable member and the cot.

3. In a device of the class described, two cots, means attached to a support to hold the inner end of one of the cots in a movable relation, means also attached to the support to hold the inner end of the other cot in a movable relation, a movable member pivoted to the last named cot holding means, another movable member attached to the support, and connecting means located respectively between the two movable members and the outer ends of the two cots.

4. In a device of the class described, a cot having an extension at each end in alinement with the side thereof, means attached to a support to engage an extension at the lower end of the cot to hold the same in a movable relation, means also attached to the support having a movable member to support the upper end of the cot, and means intermediate the movable member and the extension at the upper end of the cot, located out of alinement with the plane of the extensions, the said movable member having a lateral projection to engage the upper extension and located in alinement with the same.

In testimony of the foregoing specification, I do hereby sign the same in the city of New York county of New York and State of New York this fifth day of September 1908.

MANUEL R. RODRIGUES.

Witnesses:
 ROB. SCHWARZ,
 J. ODELL FOWLER.